(12) United States Patent
Mayer et al.

(10) Patent No.: US 7,870,151 B2
(45) Date of Patent: Jan. 11, 2011

(54) FAST ACCURATE FUZZY MATCHING

(75) Inventors: Uwe Mayer, Encinitas, CA (US); Vijay Narayanan, Mountain View, CA (US); Matthias Blume, San Diego, CA (US)

(73) Assignee: Fair Issac Corporation, Minneapolis, MN (US)

( * ) Notice: Subject to any disclaimer, the term of this patent is extended or adjusted under 35 U.S.C. 154(b) by 542 days.

(21) Appl. No.: 11/762,672

(22) Filed: Jun. 13, 2007

(65) Prior Publication Data

US 2008/0189279 A1    Aug. 7, 2008

Related U.S. Application Data

(60) Provisional application No. 60/888,721, filed on Feb. 7, 2007.

(51) Int. Cl.
*G06F 17/30* (2006.01)
*G06F 9/44* (2006.01)
(52) U.S. Cl. .................. 707/780; 717/101; 717/120
(58) Field of Classification Search ............. 707/1–10, 707/780; 705/40–45
See application file for complete search history.

(56) References Cited

U.S. PATENT DOCUMENTS

2006/0149674 A1 * 7/2006 Cook et al. ............... 705/44

OTHER PUBLICATIONS

Experian-Scorez; Hunter; http://www.experian-scorex.com/Web/map.html.
Experian's new hunter system takes the fight against fraud global. http://www.experian.com/.
IBM-Entity Analytic Solutions; https://www-306.ibm.com/software/data/db2/eas/.
Related U.S. Appl. No. 11/234,692 as filed.
Annotation Guidelines for Entity Detection and Tracking. version. 4.2.6.
Kalashnikov, D., et al. A Probablistic Model for Entity Disambiguation Using Relationships. TR-Rescue-04-12. Jun. 1, 2004.
Huang, F., et al. Automatic Extraction of Named Entity Translingual Equivalence Based on Multi-Feature Cost Minimization.
Gooi, C. H., et al. Cross-Document Coreference on a Large Scale Corpus.
Bagga, A., et al. Entity-Based Cross Document Coreferencing Using the Vector Space Model.
Ravin, Y., et al. Is Hillary Rodham Clinton the President? Disambiguating Names Across Documents.
Mihalcea, R. The Role of Non-Ambiguous Words in Natural Language Disambiguation.
Mann, G, et al. Unsupervised Personal Name Disambiguation.

\* cited by examiner

*Primary Examiner* — Hosain T Alam
*Assistant Examiner* — Navneet K Ahluwalia
(74) *Attorney, Agent, or Firm* — Mintz, Levin, Cohn, Ferris, Glovsky and Popeo, P.C.

(57) ABSTRACT

A computer-implemented technique for fuzzy matching. This works quickly yet accurately to determine if a given computer-readable record is represented, by exact match or pretty close match, in a large collection of computer-readable records. Further tools may be provided to assess the character of the match.

16 Claims, 5 Drawing Sheets

FAST ACCURATE FUZZY MATCHING

CROSS-REFERENCE TO RELATED APPLICATIONS

This application claims the benefit of the following earlier-filed U.S. Provisional Application in accordance 35 USC 119: No. 60/888,721 entitled "Fuzzy Matching," filed Feb. 7, 2007 in the names of Mayer and Narayanan. The entirety of the foregoing application is incorporated herein by reference.

BACKGROUND OF THE INVENTION

1. Field of the Invention

The present invention concerns digital data processing software and/or hardware to quickly yet accurately determine if a given computer-readable record is represented, by exact match or pretty close match, in an existing collection of computer-readable records.

2. Description of the Related Art

"Fuzzy matching" refers to a well known assortment of techniques to determine whether searched strings approximately match some given pattern string. These techniques are also known by other names such as approximate matching, inexact matching, fuzzy string searching, etc. Each implementation of fuzzy matching uses some similarity function, that is, an algorithm for determining whether the input and searched strings are similar to each other. One common similarity function is Levenshtein distance, and another is n-gram distance.

The commercial market already contains various products that employ fuzzy matching. One example is the Hunter software of Experian, which is intended to detect fraud in the customer acquisition process. Another example is found in the products of Identity Systems, formerly known as Search Software America, which provides various software products aimed at searching, finding, matching, and grouping identity data, regardless of structure, format, location, duplication, omissions or errors. Other examples are found in the products of IBM Entity Analytic Solutions (EAS), which aims to help organizations recognize the entities with which they are doing business. EAS is said to provide real time recognition and resolution, in context with existing business applications.

Although these systems provide certain benefits, Fair Isaac Corporation is interested in improving the performance and efficiency of fuzzy matching programs, since various Fair Isaac products do (or could) beneficially employ fuzzy matching. Fair Isaac has identified some areas of possible focus and some potential shortcomings of existing technology. For one, the computational complexity and cost associated with a brute-force, field by field fuzzy matching against each individual record in a reference database (e.g., a fraud file) is prohibitive in practice. Second, existing approaches can give misleading results when strong matches occur on weak data (such as the strong or identical match of a common first name such as "John"). Third, better control over the manner of fuzzy matching is desired. Fourth, the existing approaches are not as modular and easily extensible as some might like.

In view of these concerns, the existing fuzzy matching products are not completely adequate for all intended applications.

SUMMARY OF THE INVENTION

Broadly, the present disclosure concerns a new technique for fuzzy matching. This works to quickly yet accurately determine if a given computer-readable record is represented, by exact match or pretty close match, in a large collection of computer-readable records. Further tools may be provided to assess the character of the match.

The teachings of this disclosure may be implemented as a method, apparatus, logic circuit, storage medium, or a combination of these. This disclosure provides a number of other advantages and benefits, which should be apparent from the following description.

DETAILED DESCRIPTION

A. Hardware Components & Interconnections

1. Overall Structure

Figure 1:
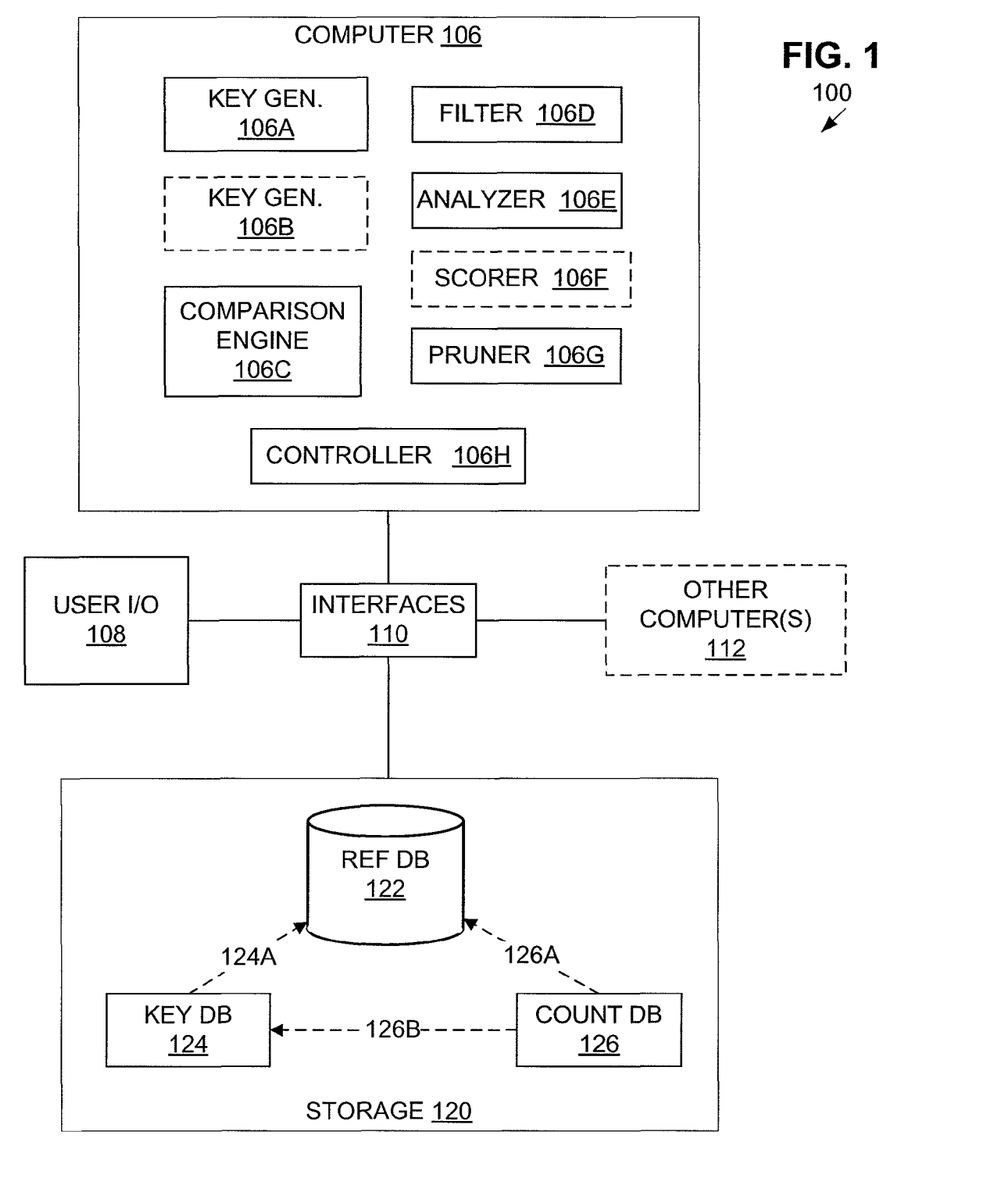
FIG. 1 is a block diagram of the components and interconnections of a computer system.

One aspect of the present disclosure concerns a computer system (100) with various components that are configured to perform expedited, accurate fuzzy matching. Broadly, the system 100 includes a computer 106, storage 120, user input/output (I/O) 108, and other computers 112. Various interfaces 110 interconnect these components. Of course, other components may be added to these, but this architecture provides a starting point to illustrate the primary features of this disclosure.

Computer 106

Referring to FIG. 1 in greater detail, the computer 106 includes key generators 106a-106b, a comparison engine 106c, filter 106d, analyzer 106e, scorer 106f, pruner 106g, and controller 106h.

The computer 106 and its subcomponents 106a-106h are data processing entities, and these may be implemented by one or more hardware devices, software devices, a portion of one or more hardware or software devices, or a combination of the foregoing. Some examples are discussed below in FIGS. 2-4. As one example, the computer 106 may be implemented by a computer workstation, mainframe computer, distributed computing arrangement, personal computer, server, or other computing machine appropriate to the implementation. In this example, the subcomponents 106a-106h are implemented by processes, subroutines, object oriented programs, Java Applets, processing threads, machine code, or other software programming of the computer 106 hardware.

Broadly, each of the key generators 106a-106b acts to receive an input string and compute an output key according to a predetermined computational formula. Under this formula, a given input string will always produce the same output key. However, several input strings (with certain types of similarities, as discussed below) will also produce the same output key. Therefore, the key generators 106a-106b serve to "fuzzify" input, and provide a "many to one" mapping between input strings and keys. Under this regime, two input strings that produce the same output key must be similar in some ways. These similarities are prescribed by the details of the key computing formula.

In the illustrated example, the key generator 106a applies one fuzzification formula, whereas the key generator 106b applies a different formula. Alternatively, the key generator 106b may be eliminated, in which case the computer 106 employs a single fuzzification formula. In still another alternative, the system 100 may include three, four, five, or any greater number of key generators. In one example, the system 100 may provide a different key generator for each different field (of current or anticipated records). Operational details of the key generators 106a-106b are described in appropriate detail below, under the heading "Operation."

The comparison engine 106c produces an initial pool of candidate records by applying fuzzy matching to a given input record and records of a reference database 122. In this operation, the engine 106c employs the key generator 106a to produce new keys for the input record, and as to the existing records (122) the engine 106c uses previous output of the key generator 106a stored in a key database 124. Operational details of the comparison engine 106c are described in appropriate detail below, under the heading "Operation."

As mentioned above, the comparison engine 106c produces a pool of candidate records. The filter 106d acts to reduce or "filter" the candidate pool of records by applying various statistical analyses. Operational details of the filter 106d are described in appropriate detail below, under the heading "Operation."

The analyzer 106e analyzes the candidate pool, providing one basis for other components to reduce the candidate pool even further as discussed below. In one embodiment, the analyzer 106e applies a second stage of fuzzy matching, which employs keys previously prepared by the key generator 106a or employs the key generator 106b to produce completely new keys for both input record and reference records (122). Operational details of the analyzer 106e are described in appropriate detail below, under the heading "Operation."

The scorer 106f applies a predetermined statistical analysis to the filtered, analyzed candidate pool in order to evaluate, score, rank, or otherwise assess these records relative to each other to relative to a predetermined standard. The scorer 106f may be omitted, if appropriate to the intended application. For instance, the end user may not care about scoring. Or, scoring may be unnecessary if the computer 106 employs a powerful analyzer 106e that limits the final record pool to manageable levels. Operational details of the scorer 106f are described in appropriate detail below, under the heading "Operation."

The pruner 106g acts to reduce the candidate pool even further according to output from the analyzer 106e and/or the scorer 106f. Operational details of the pruner 106g are described in appropriate detail below, under the heading "Operation."

The controller 106h directs the overall operation of the other components 106a-106g, coordinating the various processing stages to produce a final result. The controller 106h may perform other functions related to management of the computer 106, such as managing peripheral hardware, performing functions unrelated to fuzzy matching, etc.

Interfaces 110

The system 100 includes one or more interfaces 110 to interface the computer 106 with peripheral hardware and/or software such as user I/O 108, other computers 112, and digital data storage 120. Accordingly, the interfaces 110 include any of the following, as appropriate to serve the architecture and functionality described herein: telephone modems, cable modems, T1 interface, routers, Ethernet cards, IDE or EIDE units, satellite modems, wireless transceivers, USB interfaces, Fire wire ports, PS/2 ports, key ring networks, local area networks, wide area networks, infrared ports, etc.

User I/O 108

This component includes hardware and/or software for man-machine interface, such as video display, speakers, keyboard, digitizing pad, trackball, mouse, eye gaze tracking system, foot pedals, dials, buttons, touch screens, brain wave sensing machinery, and the like.

Other Computers 112

Optionally, the system 100 may be interfaced with one or more other computers 112 to receive input and/or provide output. As one option, the user I/O 108 may be omitted, with this user input/output occurring at one or more remote computes 112. Or, the system may work free of user input/output, with input/output coming from external machines 112 instead of humans.

Storage 120

The storage 120 provides digital data storage, various embodiments of which are described below in greater detail under the heading "Storage Media." The storage 120 includes a reference database 122, key database 124, and count database 126. Any or all of the components 120, 122, 124, 126 may be provided by relational databases, linked lists, tables, stacks, queues, or any collection of records that is structured and computer-readable, amenable for a computer program to consult and answer queries.

As mentioned below, one function of the system 100 is to determine if a given input record is represented in a collection of existing records. In this context, the reference database 122 provides the existing collection of records. The reference database 122 provides functional rows and columns representing records and fields, respectively. The database 122 may include virtually any type of data, such as a collection of current customers, past customers, perpetrators of fraud, recipients of a government benefit, etc. Or, apart from people, the database may represent other data concerning machine parts, vehicles, financial transactions, packets of communication, or any other tangible of intangible thing.

The key database 124 contains keys corresponding to given fields of each record in the reference database 122. The "given" fields, namely those having keys, may be some or even all fields in the reference database 122. There is not necessarily a one-to-one relationship between fields and keys, as several fields might be used to generate a single key, or a single field might by itself or in combination with other fields be used to generate several keys. The key database 124 may be incorporated into the reference database 122, or it may be a separate database (as shown) linked to the reference database by appropriate pointer, reference, or other link (124a). In the presently illustrated example, the fields of the reference database 122 having keys are those of a set illustrated by item 702 in FIG. 7. This is explained in greater detail below.

The count database 126 contains statistical data concerning (1) the values in the various fields of the reference database 122, or (2) the occurrence of the keys in the key database 124, or (3) both of these. The nature of the statistical data is discussed in greater detail below. The count database 126 may be incorporated into the databases 122 and/or 124, or it may be a separate database (as shown) linked to the respective databases by appropriate pointer, reference, or other links (126a, 126b).

2. Exemplary Digital Data Processing Apparatus

As mentioned above, data processing entities (such as the computer 106 and/or its various subcomponents 106a-106h) may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
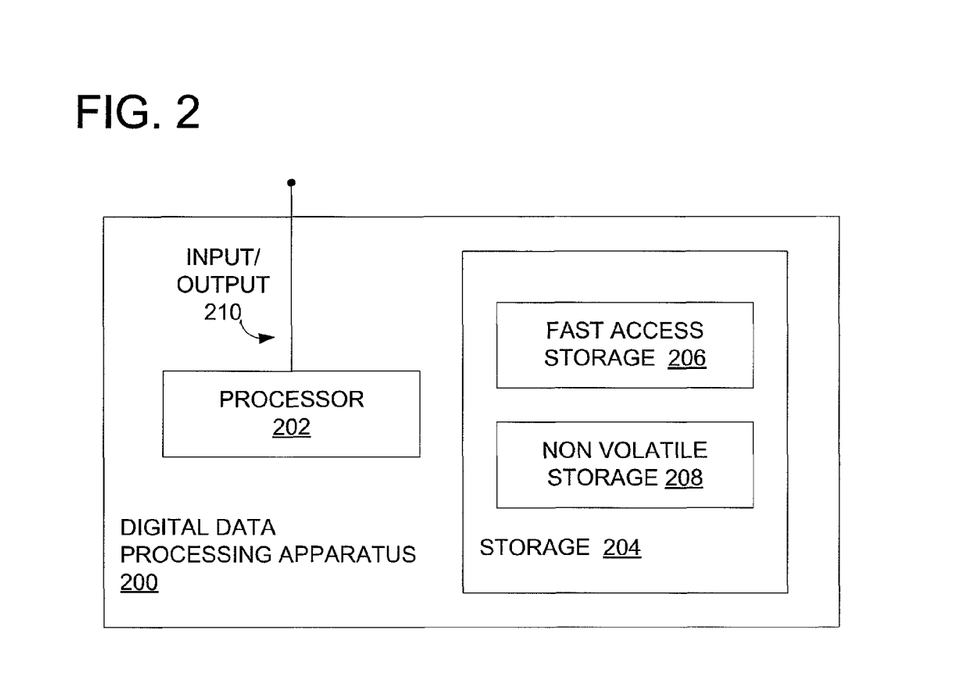
FIG. 2 is a block diagram of a digital data processing machine.
Figure 3:
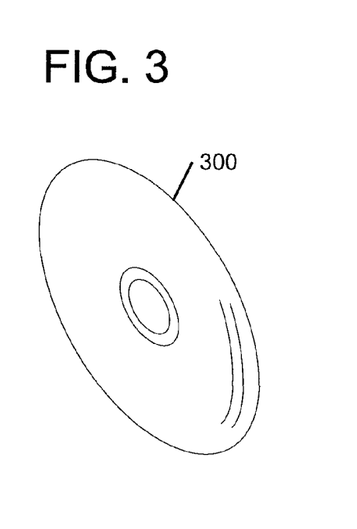
FIG. 3 shows an exemplary storage medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

3. Storage Media

As mentioned above, various instances of digital data storage may be used, for example, to provide storage used by the system 100 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally storage machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

4. Logic Circuitry

In contrast to storage media that contain machine-executable instructions (as described above), a different embodiment uses logic circuitry to implement processing features such as the computer 106 and/or any one or more of components 106a-106h.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors., capacitors, diodes, inductors, and transistors), field programmable gate array (FPGA), programmable logic array (PLA), programmable logic device (PLD), and the like.

Figure 4:
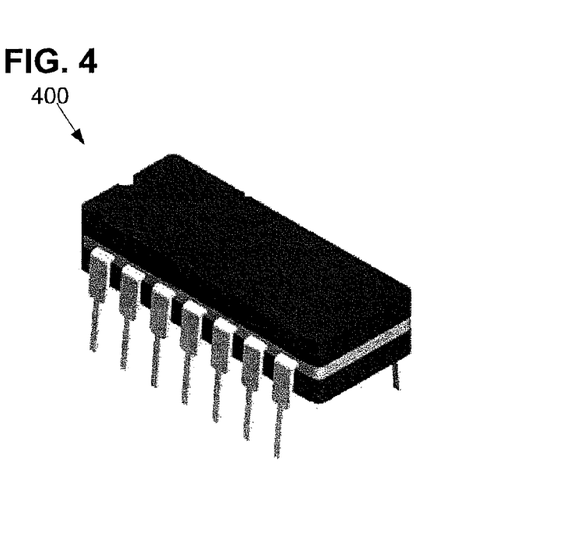
FIG. 4 is a perspective view of exemplary logic circuitry.

FIG. 4 shows an example of logic circuitry in the form of an integrated circuit 400.

B. Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

1. Introduction

A basic implementation of fuzzy matching would be to query every field, or collection of fields, of every single record in the reference database 122, and compute a fuzzy match against every field, or collection of fields, of an input record using any one of various known algorithms. One issue with such an implementation is that it scales poorly, and becomes impractical once the reference database reaches a few ten thousand records. To improve on this, the present disclosure performs a pre-filter of the records that is itself fuzzily compared.

The present implementation of fuzzy matching pre-computes a condensed key (or signature or token or other computational output) of the actual reference record fields, or collection of fields, to be matched, and stores these pre-computed keys (herein termed the "fuzzed-up fields" even in the case of collections of fields being used to generate the keys) in a separate table (124). Instead of then having to query the complete reference database 122 and compute a fuzzy match on each record, the computer 106 (in one embodiment) can reduce the list of match candidates from the reference database 122 to only those records that have at least one pre-fuzzed-up field, or collection of fields, (from the key database 124) exactly equal to the corresponding fuzzed-up field, or collection of fields, of the application to be matched. Other alternatives to this technique to reduce the list of match candidates are disclosed. Nevertheless, this gain in computational efficiency contributes to making the problem computationally tractable.

Additionally, the computer 106 can store (along with the fuzzed-up fields) the frequency with how often they occur in the data, since rare keys that match provide more information than matching of a common key. This data (126) is then available to optionally compute a weighted fuzzy match score by considering all fields used for the match, and summing up the field-level match results.

In this description, there are widespread references to the act of computing keys from record fields. It is emphasized that this disclosure contemplates, but does not require, a one-to-one relationship between fields and keys. For instance, several fields might be used to generate a single key. Or, a single field might by itself or in combination with other fields be used to generate several keys. Nevertheless, for ease of reading (but without any intended limitation), the following description references the computation of keys from record fields in terms of the basic case, where there is a one-to-one relationship.

2. Overall Sequence of Operation

Introduction

Figure 5:
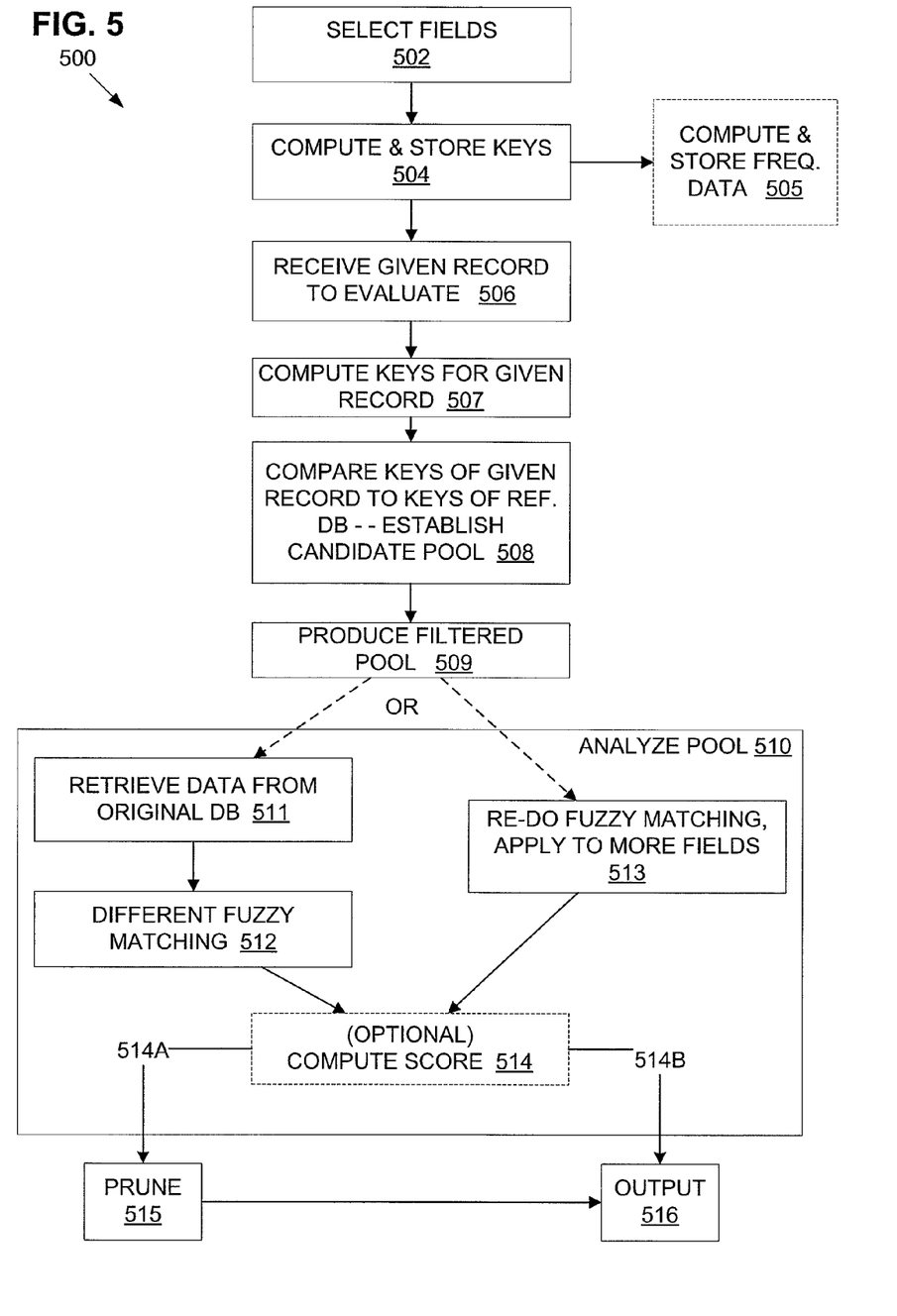
FIG. 5 is a flowchart of an overall operating sequence.

FIG. 5 shows one example of a fuzzy matching sequence 500. For ease of explanation, but without any intended limitation, the example 500 is described in the specific context of the system 100 (FIG. 1).

Select Fields

Figure 7:
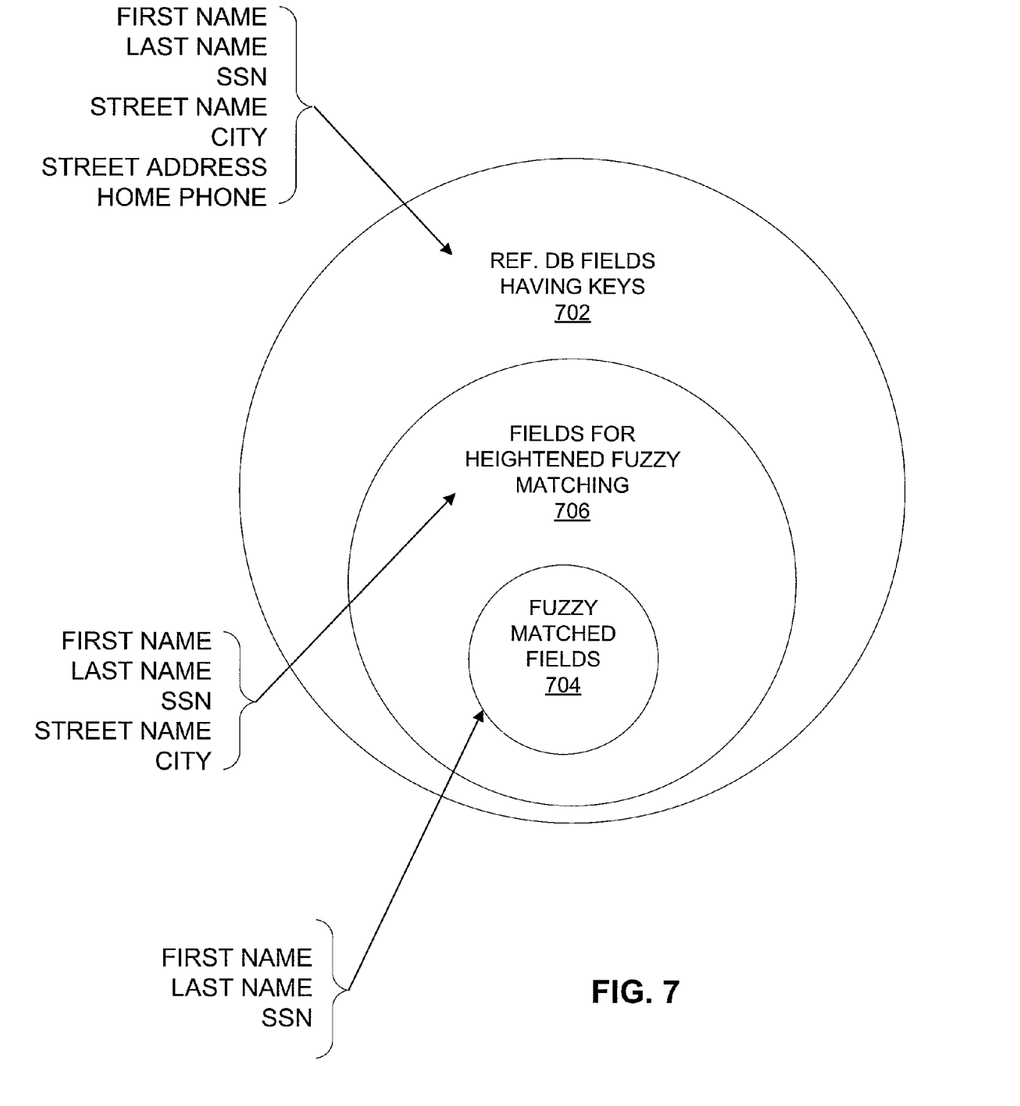
FIG. 7 is a diagram illustrating the relationship between various record sets.

In step 502, system architects select which fields of the reference database 122 will have pre-computed, pre-stored keys. Pre-computing keys for various fields of the reference database 122 will help speed fuzzy matching operations performed later. The designers in step 502 may select any fields that will be likely involved in fuzzy matching. To cite a simplified example, one set of selected fields may be: first name, last name, social security number, street name, city, street address, and home telephone. In FIG. 7, these fields (for which keys will be pre-computed and pre-stored) are illustrated by the set 702. More restrictive sets 706, 704 are used later in the sequence 500, as discussed below.

Compute Keys

For ease of discussion, records represented in the reference database 122 will be referred to as "reference records." In step 504, the controller 106h instructs the key generator 106a to compute one key for each of the fields selected in 502 (i.e., the fields 702), for each record in the reference database 122. In the simplified example given above, step 504 starts with a first record in the reference database 122, and computes a key for each value of first name, last name, social security number, street name, city, street address, and home telephone fields. Step 504 re-performs this operation for every remaining record in the reference database 124. The controller 106h or key generator 106a stores the computed keys in the key database 124.

As an alternative, instead of using the key generator 106a for all fields, the controller 106h may use different key generators for different fields or collections of fields.

As a further alternative, instead of performing step 502 on an existing reference database, step 502 may be performed from the beginning with an empty reference database 122, whenever new records arrive for storage in the reference database 124. Or, step 502 may be performed on the set of records in the reference database 122 as of a certain date, and then repeated in real time whenever new records arrive.

In order to compute the keys, the key generator 106a may use any computational formula such that each key is produced exclusively by a set of input values having certain similarities to each other. Thus, there is a many-to-one mapping from potential input strings to keys. One example of computational formula is the well known Soundex phonetic algorithm ("Russel Soundex"), which is addressed in various issued U.S. patents, technical journal articles, and at least one book. Other examples include the Celko Improved Soundex algorithm, Metaphone algorithm, Double-Metaphone, Daitch-Mokotoff (D-M) Soundex, etc. A further example is the well known NYSIS algorithm developed by the New York State Identification and Intelligence System as an improvement to Soundex. In addition or instead of these, the key generator 106a may employ any other key generating formula based on phonics, numerical, double metaphonics, etc. Optionally, different key generators (such as 106a-106b) may be invoked to vary the key formula for different fields. For example, one of key generators 106a-106b may act to simply copy-over complete, raw, or original data from the reference record into the key database 124 in the case of certain specified fields. It may prove helpful, for example, to have such field values available for later processing (as discussed below). Also, there may be fields containing unique data (such as social security numbers) for which is it unnecessary or undesirable to compute keys.

Optionally, at this time, step 505 may statistically analyze the reference database 122 in order to compute and store count data in the database 126. In this regard, the controller 106h in step 505 computes statistical data concerning the values in the various fields of the reference database 122, and/or the keys in the database 124. In the case of the reference database 122, this statistical data includes a statistical breakdown of field values, for example by count (number of occurrences), frequency of occurrence, percentile, or other assessment of values in some or all fields. This data may be broken down further by field. For example, the count database 126 may indicate that a given field value ("Oslo") occurs one hundred times in the "City Name" field of the database 122, or that "Oslo" occurs in the "City Name" field of twenty five percent of all records in the reference database 122. In the case of the key database 124, this statistical breakdown includes a statistical breakdown of the keys. For example, the count database 126 may indicate that a given key occurs one thousand times in the database 124, or that the given key constitutes forty percent of all keys in the database 124, or that the given key occurs four hundred times as to a given reference field.

Although task 505 may be performed from time to time in batch, alternatives are to calculate statistical data from the beginning with an empty reference database 122, calculate statistical data whenever new records arrive for storage in the reference database 124, or perform statistical analysis on a set of records in the reference database 122 as of a certain date, and then repeat in real time for new records that arrive.

Arrival of Input Record

In step 506, the computer 106 (and more particularly, the controller 106h) receives a record to evaluate. For ease of explanation, this is interchangeably referred to as the "given" record or "input" record. This record may come from the user I/O 108, for instance if the record is entered or submitted or identified by a human user such as a customer, system administrator, software user, or other person. Alternatively, the record may be submitted or entered or identified by a remote computer 112. As another alternative, the computer 106 itself may identify the record. For example, users may enter new records into a cache (not shown), and the computer 106 takes up cached records for processing in order of entry or another order. Or, the computer 106 may self-select records from the reference database 122 for screening or evaluation, unrelated to input of any new record. Step 506 may observe any of these approaches, or a combination.

Fuzzy Matching

In step 507-508, the computer 106 performs fuzzy matching upon the input record. In one sense, the pre-computation of keys (from step 504) may be considered an early party of fuzzy matching, too. In step 507, responsive to receiving the input record (506), the controller 106h directs the key generator 106a to compute keys for fields of the given record 507.

To expedite the overall process 500, the key generator 106a only computes keys for a limited set of fields of the given record. For example, step 507 may limit key computation to first name, last name, and social security number fields. FIG. 7 illustrates this limited set at 704, and shows that this set 704 is a smaller subset of the entire set of fields (702) for which keys were computed and stored (504) in the key database 124. By limiting fuzzy matching to the field set 704 (instead of the entire set 702) this expedites the overall process 500.

In step 508, the comparison engine 106c compares the keys for the input record (computed in step 507) with the corresponding, pre-computed keys (stored in 124) of each reference record. In conformance with the limited fuzzy matching strategy, and since step 507 only computed keys for a limited set (704) of fields, step 508 only compares keys of the limited set 704 of fields as between the given record and the reference records. In the previously introduced example, step 508 will compare the keys for the given record's first name, last name, and social security number fields to each reference record's respective keys for those same fields, looking to see if the keys match identically.

If at least one key of the given record matches a key for the same field of the reference record, that reference record is added to a "candidate pool." For example, if the given record's key for last name matches a particular reference record's key for last name, the reference record is added to the candidate pool. In one embodiment, where each reference record is given a unique record number in the database 122, addition of a record to the candidate pool may be carried out by recording the record's number in a list.

Filtering

Figure 6:
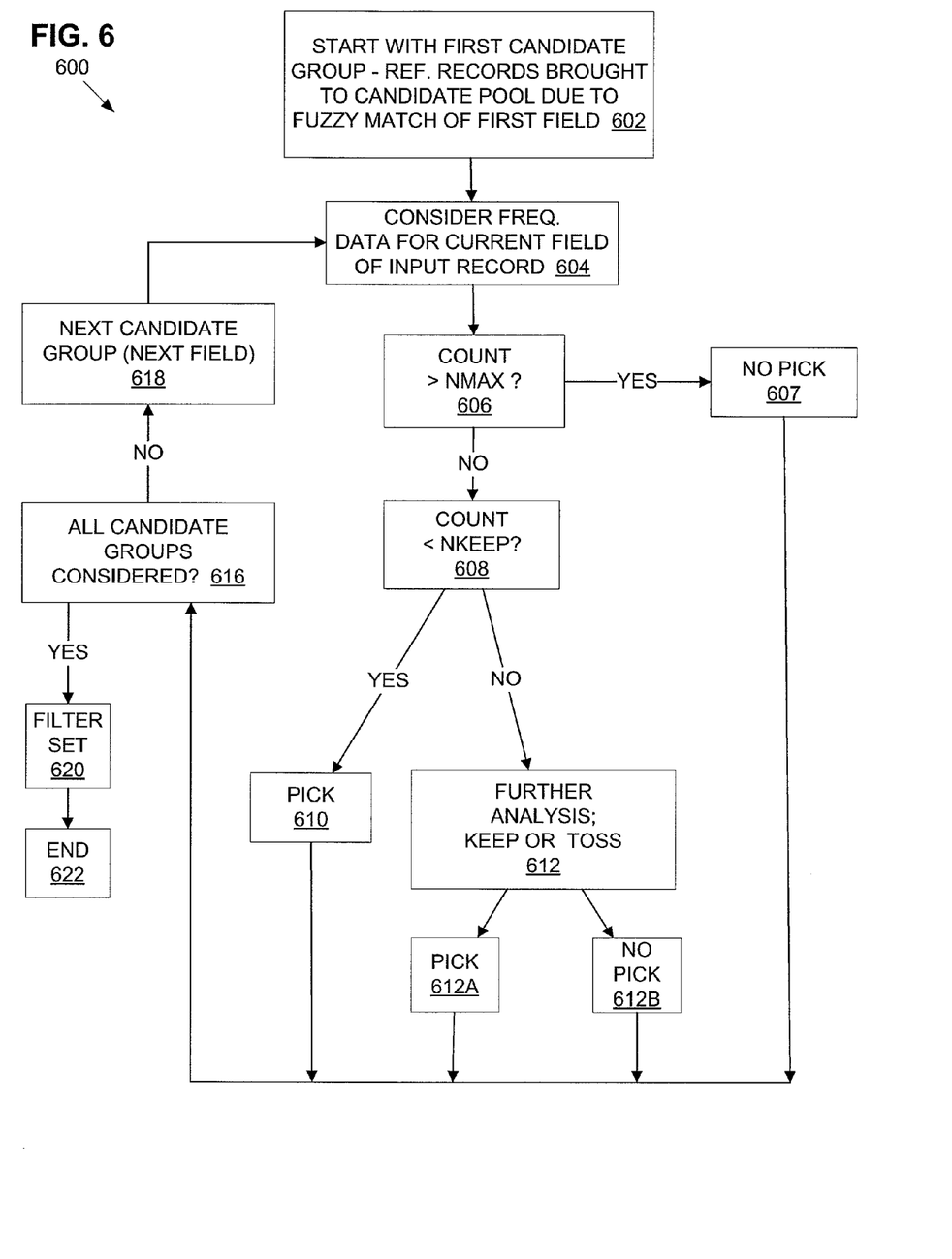
FIG. 6 is a more detailed flowchart showing a filtering task in greater detail.

In step 509, the filter 106d hones the candidate pool by removing records from the candidate pool whose fuzzy match with the input record is weak (according to predetermined criteria). Broadly stated, this is carried out by statistically analyzing the nature of the matches found in 508. For greater speed, this process utilizes the statistical data stored in the count database 126. Filtering (509) is discussed in greater detail below, with reference to the sequence 600 (FIG. 6).

Analysis

After filtering (step 509), the next step in the process 500 is to analyze the candidate pool (510). Broadly, in step 510 the analyzer 106e performs more comprehensive fuzzy matching than was conducted in steps 507-508. Now that the process 500 has narrowed the reference records down to a candidate pool (step 508) and further filtered that pool (step 509), it is possible to perform more comprehensive or comprehensive fuzzy matching without great sacrifice in computational effort. Thus, in step 510 the analyzer 106e performs fuzzy matching as between the input record and the records of the filtered and pruned candidate pool. Renewed fuzzy matching (510) may be carried out in various ways, two of which are described as follows.

Step 513 describes one exemplary technique. Here, the last part of the previously conducted fuzzy matching is repeated, but applied to a broader set of fields. In other words, and as compared to the fuzzy matching of steps 507-508 (based upon fields of the set 704 shown in FIG. 7), the renewed fuzzy matching of step 513 involves a greater number of fields (for example, the set 706 or even the set 702). Advantageously, then, the field set 706 is substantially greater than the field set 704. In the present example, the field set 706 includes first name, last name, social security number, street name, and city. Fuzzy matching of step 513 employs the same keys computed in steps 504, 507 along with additional keys that must be computed for the input record (for fields not having keys computed in 507 but are part of the fuzzy matching 513). For computing these added keys, the key generator 106a is used.

In contrast to step 513, steps 511-512 describe an alternative technique for technique. This technique employs the key generator 106b instead of the key generator 106a. For each record in the filtered pool, step 511 retrieves the complete, original, or raw record from the reference database 122 (or at minimum, the complete, original, or raw values of the fields 706). Then, step 512 computes new keys upon these field and the corresponding fields of the input record. Using these, step 512 performs fuzzy matching on all fields of the field set 706, as between the input record and the records of the filtered candidate pool. In this example, then, the approach of steps 511-512 is enhanced relative to the earlier fuzzy matching (steps 504, 507, 508) because it considers a greater number of fields (706 or even 702) than the field set (704) used in steps 504, 507, 508. Additionally, the approach of steps 511-512 is further enhanced because it employs an enhanced fuzzy matching formula, namely that of the key generator 106b rather than 106a. As to the fuzzy matching formula, this may use a similar key formula as discussed before (e.g., Soundex, NYSIS, etc.) but with different resolution, bit sampling, comparison or combination of multiple formulas, etc. Alternatively, the fuzzy matching formula of step 512 may conduct analysis unrelated to keys, with one example being the Levenshtein edit distance.

Instead of using the key generator 106b for all fields in step 512, the following is one alternative. As an example, this may be used in the embodiment (described above) where step 504 used different key generators for different fields or collections of fields. Like step 502, step 512 may use different key generators for different fields. However, in this example, the set of key generators used here is different than the set of key generators used in step 514.

Ultimately, step 510 produces a list of records referred to as a final candidate pool.

Scoring

Next, in step 514 the scorer 106f scores the candidate pool according to the analysis of step 510. Broadly, the scorer 106f analyzes records of the analyzed candidate pool to evaluate, score, rank, or otherwise assess these records relative to each other or to relative to a predetermined standard. In one example, scoring may consider factors such as inverse term frequency, i.e., terms that occur more often are given a lower score contribution than terms that occur infrequently with more significance. As a different example, step 514 may act to compute a weighted fuzzy match score by considering all fields used for the match, and summing up the field-level match results. Scoring may be implemented using these, or a combination of these, or a variety of different known techniques described in the numerous patents and patent publications of Fair Isaac Corporation. Optionally, step 514 may also produce a reason code, indicating an explanation for a given record's score.

Step 514 is optional, however, and may omitted without departing from this disclosure. As a further alternative, scoring 514 may performed at a different occasion in the sequence 500. One example is between steps 508-509, in which case operation 509 may utilize scores in performing filtering. As another example, scoring may be performed between steps 509-510, or during step 510. Thus, step 510 may utilize scoring information in performing its analysis.

Pruning & Output

After the optional scoring (step 514), the sequence 500 presents two options 514a-514b. In option 514a, the pruner 106g prunes the candidate pool (step 515) according to output from the analysis (step 510) and scoring (step 514, if applicable). To provide some examples, some examples of pruning include setting a score threshold and removing all candidates receiving a score below it, or setting several score thresholds to be used based on which fields did match, or limiting the absolute number of candidates and removing all but the highest scoring ones in case this number was exceeded, or any combination of these, or no pruning at all.

After step 515, the controller 106h in step 516 provides an output identifying the records of the pruned pool and/or the computed scores of the pruned records. Also in step 516, the controller 106h renders this output to a site such as the user I/O 108 or another computer 112. As an alternative, the controller 106h may cache the output for retrieval on demand by a user, remote machine, or automated process.

In contrast to option 514a, in option 514b the sequence 500 skips step 514a and performs step 516 as discussed above, only with regard to the un-pruned candidate pool.

3. Filtering

FIG. 6 shows one exemplary process 600 for conducting filtering as per step 509 (FIG. 5). The process 600 is carried out by the filter 106d. The process 600 works by "picking" certain candidates to retain in the candidate pool and excluding the rest.

As mentioned above, steps 507-508 perform fuzzy matching upon the input record as to the reference records. If at least one key of the input record matches a key for the same field of the reference record, that reference record is added to the candidate pool. For example, if the given record's key for last name matches a particular reference record's key for last name, the reference record is added to the candidate pool. Accordingly, a reference record may be qualified to enter the candidate pool for numerous reasons, i.e., multiple fields that demonstrate a fuzzy match with a corresponding field of the input record.

With this in mind, step 602 begins with a sub-group of the candidate pool. Namely, step 602 begins with a set of all reference records that entered the candidate pool (step 508) due to a fuzzy match occurring in a first field. The first field may be selected on any appropriate basis, such as arbitrarily, field order, alphabetic order of field names, etc. The field under discussion at any one iteration of the process 600 is referred to as the "current" field (for brevity the term "current field" is used even in case of a collection of fields).

Next, step 604 considers frequency data for the current field of the input record. As mentioned above, the sub-group of candidates under discussion qualified for the candidate pool for at least the following reason—the current field of the reference record was a fuzzy match to the current field of the input record. This is why the current field of the input record is examined in step 604. More particularly, step 604 references the database 126 to determine the count of the data from the current field of the input record.

For example, where the current field is a "City" field, step 604 may reveal that the current field of the input record is "Oslo" and this occurs in 1,263 records of the reference database 122. If the input record also qualified for the candidate pool based on a fuzzy match of another field, or another collection of fields, this is irrelevant for the present analysis.

Next, step 606 asks whether the number from step 604 is greater than a prescribed threshold ("NMAX"). If so, step 607 refrains from "picking" the current sub-group of reference records. In the present example, NMAX is set to one thousand. Thus, step 606 is satisfied in the present example because Oslo occurs in over one thousand reference records.

In a different example, if the threshold (NMAX) were set to 5,000, then step 606 would not be satisfied, and the process 600 would advance to step 608. Step 608 asks whether the number from step 604 is less than a second threshold (NKEEP). The threshold NKEEP is set sufficiently low (e.g., fifty records) so as to identify highly meaningful matches. Thus, the filter gives precedence to less common matches, which are statistically more relevant. In the present case, step 608 is not satisfied since Oslo occurs in more than fifty records. Thus, step 612 (discussed below) is performed. On the other hand, if Oslo occurred in less than fifty records, step 608 would be satisfied, and step 610 would occur. Step 610 "picks" the current sub-group of reference records. The utility of "picking" record groups is discussed in greater detail below.

As mentioned above, if step 608 is not satisfied, then step 612 occurs. Step 612 reduces the candidate pool belonging to the current field given that the size of this pool is larger than NKEEP but smaller or equal to NMAX. This reduction may be based on rules or statistical analysis, may be random, or a combination thereof. Some examples of this include:

(a) Random selection of NKEEP many records,
(b) Sort the records in increasing order by how many other fields have matched as well.
(c) Assuming that all fields are sorted by a preset importance value, sort the records from the pool by whether they match also in the most important other field, or in the second-most important other field, etc.
(d) Using pre-assigned weights for each field, for each record in the candidate pool compute a match score by summing the weights of those fields that match. Then sort the candidate records by their achieved sum of weights.
(e) Require that the candidate records also match at least a certain number (e.g., one or two) of other fields.
(f) Require that the candidate records also match a specific selection of (e.g., one or two) other fields.

For methods (b) through (f), take the top NKEEP many records. Tie breaks may be resolved randomly, or with the use of some of the other rules.

After any of steps 607, 610, 612a, or 612b complete, step 616 asks whether there are any remaining candidate subgroups to consider. Namely, step 616 asks whether the process 604-612b has progressed through all fields, or all collection of fields, and corresponding keys used in step 508. If not, step 618 advances to the next candidate group (based upon the next field of fuzzy matching), and then re-performs step 604 on this basis.

On the other hand, when step 616 finds that all candidate groups have been considered, step 620 carries out a filtering operation. Namely, step 620 creates a filtered candidate pool consisting of those reference records of the candidate pool that were "picked" in steps 610 or 612a. The process 600 ends in step 622.

4. Applications

The disclosed system 100 and processes 500, 600 may be applied in a number of different contexts. Without any intended limitation, the following is a sampling of different applications.

In one example, these techniques are employed in fraud screening. During processing of credit applications, for example, there is usually some kind of fraud screening. Credit applications are often compared against previously identified frauds. Since the fraudsters are aware of this customary check, they tend to vary their application data slightly, maybe change a spelling here or there, or change some components of the address or other information. The challenge is then to still match the application against the fraud file in a non-exact, or fuzzy, manner. Of course, the matching of applications does not have to be limited to matching against the previously identified fraud file, one can also match against previous applications, or the customer master file. In fact, fuzzy matching does not necessarily concern applications, but could be used for any kind of string data.

In another context, these techniques may be employed when people apply for government assistance, to conduct same entity analysis to see if they are already receiving assistance or another disqualifying benefit. In another context, a corporation may employ the system 100 to periodically conduct redundancy analysis in its databases, by recognizing records that (despite trivial differences) are really represent the same person or entity. For instance, a club or association may reduce magazine mailing costs by periodically screening its subscription list to identify cases where the same people mistakenly appear twice, causing two magazines to be sent to the same person. Furthermore, the system 100 is useful in numerous computing applications that seek to perform some type of same entity analysis.

C. Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for".

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing computer-readable data, comprising computer-implemented operations of:
   identifying a candidate pool of records of a multi-record computer-readable reference database by performing fuzzy matching between a first set of fields of an input record and corresponding fields of records from the reference database;
   filtering the candidate pool by removing records from the candidate pool demonstrating prescribed weaknesses of said fuzzy match with the first set of fields of the input record;
   analyzing the filtered candidate pool by performing fuzzy matching between a second set of fields of the input record and corresponding fields of records of the filtered candidate pool;
   performing at least one of the following operations:
      pruning the candidate pool according to results of the analyzing operation and providing a computer-readable output including identification of records of the pruned candidate pool, the pruning comprising removing records from the candidate pool;
      providing a computer-readable output including identification of records of the candidate pool and results of the analyzing operation;
   wherein the operations further comprise: for each record of the reference database, applying a first group of one or more key generators to a third set of fields of said record to compute keys from values of said fields, where the key generators of the first group are programmed to compute keys such that each key is produced exclusively by a set of input values having predetermined similarities to each other;
   the operation of identifying a candidate pool comprises, performing operations comprising:
      applying the first group of key generators to compute keys from values of fields of the first set of fields of the input record, the first set being a subset of the third set;
      comparing the keys computed from fields of the input record to keys computed from corresponding fields of records of the reference database;

designating the following as a candidate pool: any record in the reference database where at least one key computed from one or more fields of said record matches a key computed from corresponding fields of the input record.

2. The method of claim 1, the operation of analyzing the filtered candidate pool by performing fuzzy matching between a second set of fields of the input record and corresponding fields of records of the filtered candidate pool employing one of the following: Levenshtein distance, another methodology unrelated to computing keys.

3. The method of claim 1, the operation of applying the first group of key generators comprises:
for certain of the first set of fields, computing keys such that each key is produced exclusively by a set of input values having predetermined similarities to each other;
for remaining ones of the first set of fields, utilizing the following as keys as to the input record: substantially unchanged values of the remaining fields from the input record;
for remaining ones of the first set of fields, utilizing the following as keys as to records of the reference database: substantially unchanged values of the remaining fields from the reference database.

4. The method of claim 1, the analyzing operation further comprising at least one of:
scoring records of the candidate pool;
scoring records of the pruned candidate pool.

5. The method of claim 1, where the operation of applying the first group of key generators is conducted according to at least one of:
applying one key generator to one field to produce one key;
applying one key generator to a collection of multiple fields to produce one key;
applying multiple key generators to one field to produce multiple keys;
applying different key generators to different fields of a single record.

6. The method of claim 1, the filtering operations comprising:
for a group of all records experiencing a fuzzy match with the input record as to a given field or collection of fields, referencing statistics regarding occurrence of values of the given field or collection of fields across all records in the reference database;
if said occurrence is greater than a first number, refraining from adding said group of records to a filtered list of records;
if said occurrence is less than a second number, adding said group of records to the filtered list of records;
if said occurrence is between the first and second numbers, applying prescribed criteria to select records from the group of records for adding to the filtered list of records;
repeating each of the foregoing operations for all fields of the first set.

7. The method of claim 1, the operations further including computing count data summarizing at least one of the following: (1) occurrence of keys computed from records in the reference database; (2) occurrence of values of fields of records in the reference database;
where the operation of filtering the candidate pool comprises applying the count data to records of the candidate pool.

8. The method of claim 6, the prescribed criteria comprising any of the following: randomly selecting records;
sorting records according to a count of how many fields have contributed to producing one of said matching keys, and selecting top sorted records;
where fields are ranked by a preset importance value, sorting records according to ranking of fields for which one of the matching keys was computed, and selecting top sorted records;
where fields have pre-assigned weights, sorting records according to sum of weights of fields for which one of said matching keys was computed, and selecting top sorted records;
selecting all records in the candidate pool except records that fail to include a prescribed minimum number of fields for which one of the matching keys was computed.

9. The method of claim 1, the operation of analyzing the filtered candidate pool comprising:
obtaining original records of the filtered candidate pool from the reference database, and performing fuzzy matching between the second set of fields of the input record and corresponding fields of the retrieved original records;
where the fuzzy matching performed upon said second set of fields employs a different formula than fuzzy matching performed in the operation of identifying the candidate pool.

10. The method of claim 9, the different formula employing at least one of the following relative to fuzzy matching performed in the operation of identifying the candidate pool: greater resolution, greater bit sampling.

11. The method of claim 1, the operation of analyzing the filtered candidate pool comprising: performing fuzzy matching utilizing (1) keys computed from the second set of fields of the input record and (2) keys computed from corresponding fields of records in the reference database.

12. The method of claim 1, where the second set is substantially greater in number than the first set.

13. A method of processing computer-readable data, comprising computer-implemented steps of:
a step for identifying a candidate pool of records of a multi-record computer-readable reference database by performing fuzzy matching between a first set of fields of an input record and corresponding fields of records from the reference database;
a step for filtering the candidate pool by removing records from the candidate pool demonstrating prescribed weaknesses of said fuzzy match with the first set of fields of the input record;
a step for analyzing the filtered candidate pool by performing fuzzy matching between a second set of fields of the input record and corresponding fields of records of the filtered candidate pool;
performing at least one of the following operations:
a step for pruning the candidate pool according to results of the analyzing operation and providing a computer-readable output including identification of records of the pruned candidate pool, the pruning comprising removing records from the candidate pool;
a step for providing a computer-readable output including identification of records of the candidate pool and results of the analyzing operation;
wherein the steps further comprise: for each record of the reference database, a step for applying a first group of one or more key generators to a third set of fields of said record to compute keys from values of said fields, where the key generators of the first group are programmed to compute keys such that each key is produced exclusively by a set of input values having predetermined similarities to each other;

the step of identifying a candidate pool comprises, performing steps comprising:
  a step for applying the first group of key generators to compute keys from values of fields of the first set of fields of the input record, the first set being a subset of the third set;
  a step for comparing the keys computed from fields of the input record to keys computed from corresponding fields of records of the reference database;
  a step for designating the following as a candidate pool: any record in the reference database where at least one key computed from one or more fields of said record matches a key computed from corresponding fields of the input record.

14. A computer readable medium non-transitory storing a program for performing operations comprising:
  identifying a candidate pool of records of a multi-record computer-readable reference database by performing fuzzy matching between a first set of fields of an input record and corresponding fields of records from the reference database;
  filtering the candidate pool by removing records from the candidate pool demonstrating prescribed weaknesses of said fuzzy match with the first set of fields of the input record;
  analyzing the filtered candidate pool by performing fuzzy matching between a second set of fields of the input record and corresponding fields of records of the filtered candidate pool;
  performing at least one of the following operations:
    pruning the candidate pool according to results of the analyzing operation and providing a computer-readable output including identification of records of the pruned candidate pool, the pruning comprising removing records from the candidate pool;
    providing a computer-readable output including identification of records of the candidate pool and results of the analyzing operation;
  wherein the operations further comprise: for each record of the reference database, applying a first group of one or more key generators to a third set of fields of said record to compute keys from values of said fields, where the key generators of the first group are programmed to compute keys such that each key is produced exclusively by a set of input values having predetermined similarities to each other;
  the operation of identifying a candidate pool comprises, performing operations comprising:
    applying the first group of key generators to compute keys from values of fields of the first set of fields of the input record, the first set being a subset of the third set;
    comparing the keys computed from fields of the input record to keys computed from corresponding fields of records of the reference database;
    designating the following as a candidate pool: any record in the reference database where at least one key computed from one or more fields of said record matches a key computed from corresponding fields of the input record.

15. A digital data processing apparatus programmed to perform operations comprising:
  identifying a candidate pool of records of a multi-record computer-readable reference database by performing fuzzy matching between a first set of fields of an input record and corresponding fields of records from the reference database;
  filtering the candidate pool by removing records from the candidate pool demonstrating prescribed weaknesses of said fuzzy match with the first set of fields of the input record;
  analyzing the filtered candidate pool by performing fuzzy matching between a second set of fields of the input record and corresponding fields of records of the filtered candidate pool;
  performing at least one of the following operations:
    pruning the candidate pool according to results of the analyzing operation and providing a computer-readable output including identification of records of the pruned candidate pool, the pruning comprising removing records from the candidate pool;
    providing a computer-readable output including identification of records of the candidate pool and results of the analyzing operation;
  wherein operations further comprise: for each record of the reference database, applying a first group of one or more key generators to a third set of fields of said record to compute keys from values of said fields, where the key generators of the first group are programmed to compute keys such that each key is produced exclusively by a set of input values having predetermined similarities to each other;
  the operation of identifying a candidate pool comprises, performing operations comprising:
    applying the first group of key generators to compute keys from values of fields of the first set of fields of the input record, the first set being a subset of the third set;
    comparing the keys computed from fields of the input record to keys computed from corresponding fields of records of the reference database;
    designating the following as a candidate pool: any record in the reference database where at least one key computed from one or more fields of said record matches a key computed from corresponding fields of the input record.

16. An apparatus comprising:
  means for identifying a candidate pool of records of a multi-record computer-readable reference database by performing fuzzy matching between a first set of fields of an input record and corresponding fields of records from the reference database;
  means for filtering the candidate pool by removing records from the candidate pool demonstrating prescribed weaknesses of said fuzzy match with the first set of fields of the input record;
  means for analyzing the filtered candidate pool by performing fuzzy matching between a second set of fields of the input record and corresponding fields of records of the filtered candidate pool;
  means for performing at least one of the following operations:
    pruning the candidate pool according to results of the analyzing operation and providing a computer-readable output including identification of records of the pruned candidate pool, the pruning comprising removing records from the candidate pool;
    providing a computer-readable output including identification of records of the candidate pool and results of the analyzing operation;
  means for applying a first group of one or more key generators to a third set of fields of said record, for each record of the reference database, to compute keys from values of said fields, where the key generators of the first group are programmed to compute keys such that each key is produced exclusively by a set of input values having predetermined similarities to each other;

means for applying the first group of key generators to compute keys from values of fields of the first set of fields of the input record, the first set being a subset of the third set;

means for comparing the keys computed from fields of the input record to keys computed from corresponding fields of records of the reference database;

means for designating the following as a candidate pool: any record in the reference database where at least one key computed from one or more fields of said record matches a key computed from corresponding fields of the input record.

* * * * *